United States Patent [19]

Sundberg

[11] 4,144,115
[45] Mar. 13, 1979

[54] METHOD OF FABRICATING BATTERY ELECTRODE SHEATHS

[75] Inventor: Erik Sundberg, Yardley, Pa.

[73] Assignee: Aktiebolaget Tudor, Sweden

[21] Appl. No.: 800,529

[22] Filed: May 25, 1977

Related U.S. Application Data

[62] Division of Ser. No. 720,087, Sep. 2, 1976, Pat. No. 4,048,398.

[51] Int. Cl.² .................. H01M 2/18; B32B 31/16; B32B 31/26
[52] U.S. Cl. .................................. 156/161; 156/165; 156/229; 156/296; 156/309; 428/212; 428/296; 428/373; 429/140; 429/238
[58] Field of Search ............... 429/136, 140, 238; 156/148, 161, 229, 290, 296, 165, 172, 175, 309; 428/212, 373, 296; 264/171, 174

[56] References Cited

U.S. PATENT DOCUMENTS

| 2,176,428 | 10/1939 | Kershaw | 429/140 |
| 2,308,593 | 1/1943 | Brew | 428/373 |
| 3,081,368 | 3/1963 | Wunsche | 429/140 |
| 3,589,956 | 6/1971 | Kranz et al. | 264/171 |
| 3,619,319 | 11/1971 | Utz | 156/296 |
| 3,801,399 | 4/1974 | Sundberg | 429/238 |
| 3,930,091 | 12/1976 | Lewis et al. | 156/148 |
| 4,048,398 | 9/1977 | Sundberg | 429/140 |

*Primary Examiner*—Jerome W. Massie
*Attorney, Agent, or Firm*—Burns, Doane, Swecker & Mathis

[57] ABSTRACT

A sheath for a storage battery electrode comprises a braid or weave of inorganic fiber threads and a plurality of axial threads extending along the axial length of the sheath and forming crossing points with the inorganic threads. The axial threads comprise a mixture of at least two thermoplastic materials having different softening temperatures. Fabrication of the sheath involves tensioning the sheath and heating it to a temperature sufficient to soften the thermoplastic fiber having the lower softening temperature to bond the latter to the inorganic fibers at the crossing points. The heating is sufficient to weaken the thermoplastic fibers having the higher softening temperature to enable the latter to be only slightly elongated under tension, to enable internal stresses of the axial threads to be substantially equalized.

6 Claims, 4 Drawing Figures

METHOD OF FABRICATING BATTERY ELECTRODE SHEATHS

This is a division, of application Ser. No. 720,087, filed Sept. 2, 1976, now U.S. Pat. No. 4,048,398.

BACKGROUND AND OBJECTS

The present invention refers to tubular electrodes for lead-acid storage batteries. Tubular electrodes consist of a plurality of metallic rods or cores arranged parallel to and at a distance from each other, which cores are conductively connected with each other. Each of the metallic cores is surrounded by and in contact with active material which, in turn, is surrounded by a tubular sheath.

The rod sheaths are electrically insulating. The material of the sheaths is resistant to the electrolyte and to the attacks to which it is exposed in the battery cell during operation, especially oxidation due to nascent oxygen. The sheaths must be easily permeable by the electrolyte, produce as little electric resistance as possible, and prevent the active material from losing contact with the conductive core.

At one time the sheaths were made of slit hard rubber but have later come to comprise woven or braided materials of various kinds of impregnated threads or of thermoplastic foil or the like. The replacement of the hard rubber tubes with woven material constitutes a big step forward with respect to durability, capacity and effectiveness. It has been proposed that the sheaths comprise braided or woven threads of plastic fiber, for example, a polyester of ethylene glycol and terephthalic acid. Sheaths comprising a glass fiber weave impregnated with some plastic that is resistant under these conditions, for example phenol resin, have come into use with some success.

Glass of suitable quality has been found especially usable for the fibers in the preparation of the woven or braided sheaths in that the glass does not stretch, or at least only insignificantly. This keeps the active material in good contact with the conductive rods or cores despite the tendency of the active material to swell during electrical discharge of the battery. If a braided tube is under pressure it will increase in diameter and at the same time become shorter in length. For that reason, axial warps or stem threads have been used to bind the weave or braid.

It has been found difficult to bind together the weave or braid of the sheaths due to the smooth surface of the glass fibers. It is not permissible for the glass threads in the sheaths to slide in relation to each other and in that way to create an irregular weave structure whereby in some places the distance between the threads may become so large that active material can force itself through and thus lose contact with the electrode. To prevent the appearance of excessively large openings in the sheath weave or braid when the glass fiber yarn is used, it has been proposed that stem threads of thermoplastic material, for example, polyethylene or polypropylene be provided which extend in the axial direction of the sheath. These stem threads would be welded to the other usually multifiber glass weave threads by a suitable heat treatment.

Braided or knitted sheaths have also been proposed. These sheaths consist of thermoplastic monofilament threads which are welded together by a heat treatment and thereby receive the necessary rigidity for the subsequent application to the electrode skeleton.

All the electrode sheaths enumerated hereabove are subject to certain disadvantages, which have resulted in some of the constructions having been abandoned. It has also been found that modern types of glass compounded for the purpose are preferable to the plastic. The glass is also considerably more inexpensive than corresponding threads of other material suitable for the purpose.

As previously mentioned, however, the glass threads in the sheath weave must be fixed, i.e., locked to each other, so that they cannot shift in relation to each other. When woven or braided threads of thermoplastic material are employed, it has been found that the plastic material will shrink and thus shorten the length of the sheath during the heat treatment.

A braided sheath having axial stem threads must be braided to an exact diameter such as with the help of a mandrel, contrary to a braid without stem threads which is able to change in diameter with changes in length of the sheath. In a continuous heat treating process involving braided sheaths with thermoplastic stem threads, the braiding must be tensioned to prevent shrinkage thereof and a resulting increase of the sheath diameter, as well as to advance the sheath along the mandrel. However, if the stem threads are merely thermoplastic fibers which are softened or melted in order to bind the glass fibers, the tensioning of the sheath would cause the sheath to be stretched and elongated and the diameter thereof would become smaller.

In Sundberg U.S. Pat. Nos. 3,801,399 and 3,694,265, stem threads are used which comprise two different fibers, one glass and one thermoplastic. The glass fibers prevent a changing in length of the sheath during the manufacturing process. However, while this method provides sheaths with a very uniform diameter, it is very difficult to produce uniform internal stressing in the stem threads of glass. That is, during the braiding process, the axial threads tend to twist and untwist, resulting in the formation of internal stressing of the glass fibers, which can be non-uniform from one fiber to the next. Subsequent to the heating process when the tension is released, the various stressed glass fibers may tend to contract different amounts, thereby tending to deform the sheath with bends or twists. For instance, if the sheath is rectangular and the shorter stem thread is located in a corner of the sheath, it will result in a twisted sheath.

It is an object of the present invention to provide a novel electrode sheath.

It is another object of the invention to provide a novel electrode sheath which is not subject to bending or twisting during manufacture.

It is an additional object of the invention to provide a novel electrode sheath in which the lengths of axial stem threads are essentially uniform.

BRIEF DESCRIPTION

At least some of these objects are achieved by the present invention involving a sheath for a storage battery electrode which comprises a braid or weave of inorganic fiber threads and a plurality of axial threads extending along the axial length of the sheath and forming crossing points with the inorganic threads of the braid or weave. The axial threads comprise a mixture of at least two thermoplastic materials having different softening temperatures. The inorganic threads are held together by adhesion of the thermoplastic fibers with the lower softening temperature. Fabrication of the sheaths involves tensioning the sheath and heating it to a temperature sufficient to soften the thermoplastic fiber having the lower softening temperature to bond the latter to the inorganic fibers. The heating is sufficient to weaken the thermoplastic fibers having the higher softening temperature to enable the latter to be slightly elongated during tension, while being more resistive to such elongation than the softened fiber having a lower softening temperature.

If desired, more than two thermoplastic fibers can be employed in the fabrication of the axial threads. In that case, of the fibers having the lower softening temperatures, one would melt during the heat treatment and the other would soften. As in the case of a two-fiber axial thread, the fiber with the highest softening temperature would weaken only slightly so as to be extended a slight amount to equalize stresses and lengths of the axial fibers.

THE DRAWINGS

Other objects and advantages of the present invention will become apparent from the claims and from the following detailed description when read in conjunction with the appended drawings, in which:

DETAILED DESCRIPTION

Figure 1:
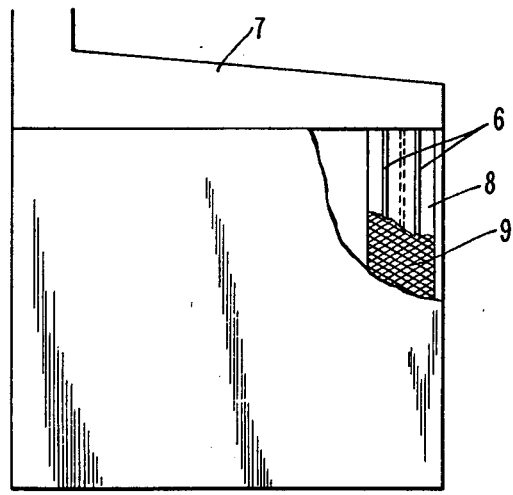
FIG. 1 is an elevational side view of a battery electrode with portions broken away to show the internal construction thereof.

With reference to FIG. 1, an electrode comprises a plurality of metallic rods 6 conductively coupled by a cross member 7. Surrounding each of the rods 6 is active material 8 held in place on the rods by a sheath 9.

Figure 3:
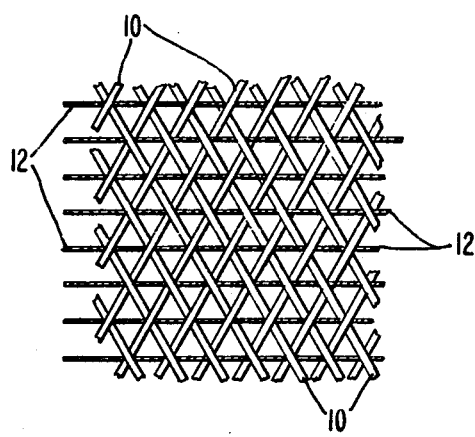
FIG. 3 illustrates the sheath of FIG. 2 cut open along the lines 3—3 and flattened out in a planar condition.
Figure 4:
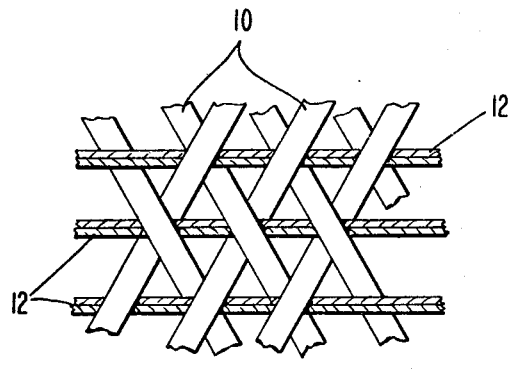
FIG. 4 is a second embodiment of the sheath of the present invention in a flattened out condition.

The sheath 9 comprises a tubular weave or braid of glass fiber threads 10 provided with stem threads 12 extending in the axial direction of the tubular sheath. The stem threads 12 comprise at least two fibers formed of thermoplastic materials having different softening temperatures. One of the plastic fibers is preferably a multifilament type. The fibers can be parallel (FIG. 4) or twisted together (FIG. 3) to form the stem thread.

During manufacture of the sheath, the sheath is advanced along a mandrel and passes through a heating station 14 (FIG. 2) wherein the strengths of the fibers are altered in different amount. That is, in instances where the stem thread comprises two fibers, the duration and intensity of the heat treatment is such as to allow the thermoplastic fiber with the lower softening temperature to soften or melt exactly as much as is required to bond the plastic to the intersecting glass fiber threads 10, and at the same time, to heat the thermoplastic fiber with the higher softening temperature to sufficiently weaken the latter so that it can be slightly lengthened by the tensioning forces while still resisting excessive stretching of the sheath. Thus, during the heating step, the fiber with the lower softening temperature loses substantially all of its physical strength, while the other fiber, with the higher softening point, retains most of its mechanical strength and will be only slightly elongatable.

During this heat treatment, the fiber with the lower softening point will adhere to the glass yarns to mutually bond the latter and will also be elongated the slight degree permitted by the other fiber. As a result, the internal stress patterns of the axial fibers is made substantially uniform, and subsequent release of the tensioning of the sheath will not result in uneven contraction of the axial fibers and an accompanying deformation of the sheath.

As an example, the stem threads can comprise a polyethylene fiber which softens at about 110° C. and a polypropylene fiber which softens at about 150° C. The fibers are heated to a temperature of 150° C. in the heat treatment step. The sheath formed by such a process comprises a braid or weave of continuous multifilament glass fiber yarn, with the axially extending threads ("stems" in braided sheaths and "warp threads" in woven ones) comprising polyethylene fibers bonded to the glass yarn only at their crossing points, and threads of staple fibers disposed parallel thereto. Since most of the internal stresses in the various stem fibers have been equalized during the heating process, due to the limited elongation permitted by the polypropylene fibers, there are virtually no twists or bends in the final sheath.

There are also many polyesters and polyolefins which could be employed as axial fibers and there is no need to list all of these, their utility being readily apparent to one skilled in the art.

Figure 2:
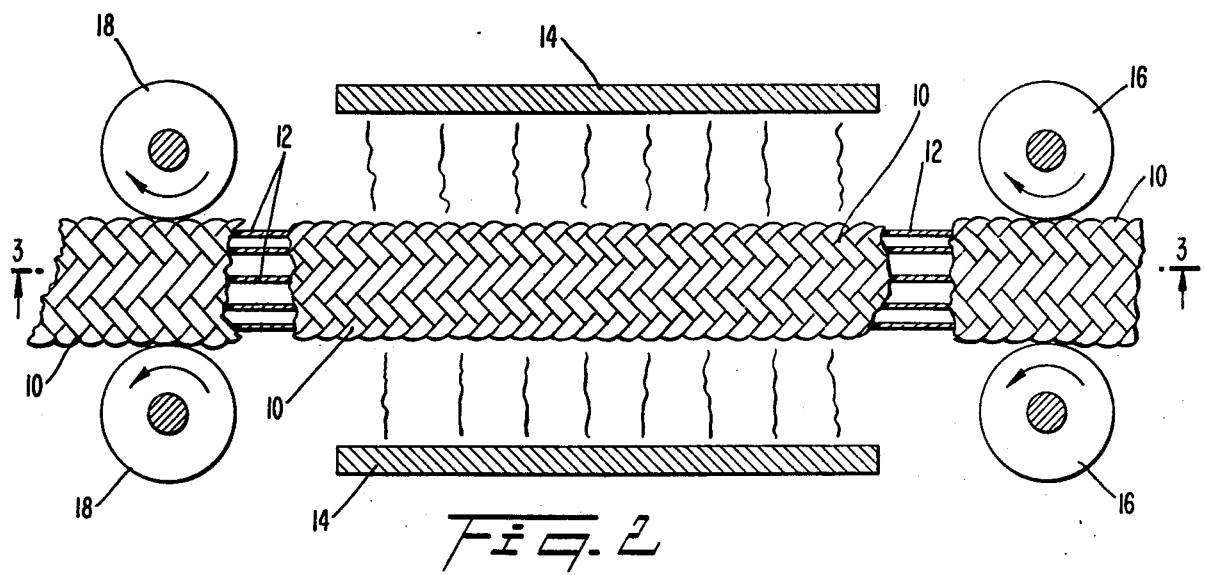
FIG. 2 illustrates the continuous heat treating of a longitudinal portion of a braided sheath with portions broken away to show the construction thereof.

As illustrated in FIG. 2, the tubular sheath of the present invention may be continuously heat treated while traveling through a cylindrical heating element 14 under the tensile force provided by two pairs of gripping wheels 16 and 18. Tension may be provided, for example, by driving the leading pair of wheels 18 slightly faster than wheels 16. The sheath may, if desired, be supported on a cylindrical mandrel (not shown) while being heat treated, and thereafter cut to desired lengths.

Alternatively to the continuous process previously described, the ends of precut lengths of sheath may be gripped and the sheaths thereafter placed under appropriate tension during the heat treating step.

The placing of the sheath under tension during the heat treatment prevents the shrinkage of the plastic material and substantially equalizes the internal stressing of the stem threads at least as insofar as to provide substantially equal lengths thereof when no longer tensioned. As noted earlier, this, as a practical matter, is very important to prevent bending or twisting of the sheath. The amount of tension to be applied will be determined in accordance with rendering all stem threads the same length following the heat treatment.

In accordance with the present invention, it may be advantageous to initially braid the sheath with an initial diameter that is greater than the desired final diameter. This would be determined so that when the fibers are subsequently slightly elongated in the heating step, the sheath would be reduced to the desired diameter.

Regarding possible materials for the axial threads, any fiber employed must be resistant to the conditions present in a lead-acid battery. Very suitable thermoplastic materials are polyolefins. By means of different polymerization, it is possible to choose between a large number of materials. After the heat treatment, such sheaths show extremely good rigidity, shape, permanence and permeability, and are straight without bending or twisting. Moreover, batteries equipped with electrodes having sheaths formed in accordance with the present invention show relatively low internal resistance.

The tubular sheath might be made stiffer for easier treating during assembling of the electrodes by dressing the same with a dressing-glue. Polyvinyl alcohol may be employed as a stiffener as this material is soluble in the electrolyte and accordingly does not diminish the porosity of the tubular sheath. Other suitable stiffeners are starch, dextrin and the like.

As was noted previously, the stem thread according to the invention comprises at least two fibers of different softening temperature. If desired, one or more additional thermoplastic fibers could be employed in the axial thread. The softening temperature of such additional fiber would be less than that of the previously discussed fiber having the lower softening temperature. More particularly, the additional fiber would be formed of a plastic material that melts during the heat treatment. The remaining two fiber would behave as discussed previously. The additional axial fiber would thus augment the bonding of the glass threads of the braid or weave. In this regard, different polyolefins could be suitably employed in a three-fiber axial thread.

EXAMPLE

A sheath is formed on a mandrel by braiding continuous multifilament glass fiber yarn, with stem threads extending axially therealong. The stem threads each comprise a polyethylene fiber which softens at about 110° C. and a polypropylene fiber which softens at about 150° C. The fiber is introduced into a heater and is heated to about 140° C., while being axially tensioned. The polyethylene fibers are softened sufficiently to become bonded to the braided glass yarn, and the polypropylene fibers are slightly weakened to enable a slight elongation of the sheath and thereby equalize internal stresses in the stem threads. Upon cooling, the polyethylene fibers adhere to the glass yarn to reinforce the sheath, and the sheath is essentially free of twists and bends.

If desired, the stem threads could be formed of polyester and polyolefin fibers.

The stem threads can comprise three fibers, i.e., an additional, third fiber can be employed having a softening temperature less than the two previously discussed. In such case, the third fiber melts during heating and bonds to the glass yarn to augment the reinforcement of the sheath.

The sheath can be formed such that its pre-heating diameter is slightly greater than the desired diameter by an amount determined in accordance with the elongation and accompanying reduction in diameter of the sheath expected during heating and tensioning. During heat and tensioning, the sheath is slightly stretched to its desired final diameter.

The present embodiments are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by letters patent is:

1. A method of forming a tubular sheath for maintaining active material in an electrode in a lead-acid storage battery comprising the steps of:
   providing a sheath comprising a braid or weave of inorganic fiber threads having a plurality of spaced axial threads extending axially along the length thereof and forming crossing points with the threads of the braid or weave, said axial threads comprising a mixture of at least two thermoplastic fibers having different softening temperatures;
   tensioning the braid or weave in the axial direction;
   heating the tensioned braid or weave to a temperature sufficient to:
      soften the thermoplastic fiber having the lower softening temperature to bond the latter to the inorganic fibers at their crossing points only; and
      weaken the thermoplastic fibers having the higher softening temperature to enable the latter to be only slightly elongated during tensioning to substantially equalize stresses within said last-named fibers so that the latter are of the same length following release of the tensioning;
   cooling the sheath; and
   releasing the tensioning.

2. The method according to claim 1 wherein said providing step includes providing two thermoplastic fibers in each axial thread, one of which fibers comprising polyethylene and the other comprising polypropylene.

3. The method according to claim 1 wherein said providing step includes providing two thermoplastic fibers in each axial thread, one of which fibers comprising a polyester and the other comprising a polyolefin.

4. The method according to claim 1 wherein said providing step includes providing three thermoplastic fibers having different softening temperatures, with the two fibers having the lower softening temperatures being softened sufficiently to adhere to the yarns of the braid or weave.

5. The method according to claim 1 wherein the step of providing a braid or weave comprises providing a braid or weave of multi-filament glass yarn.

6. The method according to claim 1 wherein said providing step further comprises providing a sheath whose initial diameter is greater than the desired final diameter, the slight elongation during said heating step being such as to reduce said sheath to the desired final diameter.

* * * * *